(12) United States Patent
El-Nakhily et al.

(10) Patent No.: US 8,214,245 B2
(45) Date of Patent: Jul. 3, 2012

(54) METHOD AND SYSTEM FOR SYNCHRONIZING INCLUSIVE DECISION BRANCHES

(75) Inventors: Ahmed El-Nakhily, Giza (EG); Ossama Shokry, Giza (EG)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/434,865

(22) Filed: May 4, 2009

(65) Prior Publication Data

US 2010/0281241 A1 Nov. 4, 2010

(51) Int. Cl.
*G06Q 90/00* (2006.01)
(52) U.S. Cl. ..................................... 705/7.27
(58) Field of Classification Search ............... 705/7.11, 705/7.27
See application file for complete search history.

(56) References Cited

U.S. PATENT DOCUMENTS

| | | | |
|---|---|---|---|
| 2006/0053039 A1 | 3/2006 | Gamarnik et al. | |
| 2007/0266377 A1* | 11/2007 | Ivanov | 717/136 |
| 2009/0281865 A1* | 11/2009 | Stoitsev | 705/9 |

OTHER PUBLICATIONS

W.M.P. van der Aalst, et al., "Workflow Patterns," 14 Distributed and Parallel Databases, pp. 5-51 (2003).*

Jana Koehler & Jussi Vanhatalo, "Process Anti-Patterns: How to Avoid the Common Traps of Business Process Modeling," 10 IBM Websphere Developer Technical Journal (2007).*
Stephen A. White, "Process Modeling Notations and Workflow Patterns," BPTrends (2004).*
Chun Ouyang, et al., "Pattern-based Translation of BPMN Process Models to BPEL Web Services," 5 International Journal of Web Services Research 42-62 (2007).*
Koehler et al.; Process Anti-Patterns: How to Avoid the Common Traps of Business Process Modeling; IBM Research Report; 40 pages.

* cited by examiner

*Primary Examiner* — Neil Kardos
(74) *Attorney, Agent, or Firm* — Schmeiser, Olsen & Watts

(57) ABSTRACT

A method and system for reconstructing an original process model that includes an inclusive decision into a reconstructed process model that includes synchronized branches. The inclusive decision is replaced with a fork. Each original path of the inclusive decision is reconstructed into a corresponding reconstructed path. Each reconstructed path includes a decision, an activity included in the corresponding original path, and a merge. The decision includes a first output connected to the activity, whose output is connected to a first input of the merge. The decision further includes a second output connected to a second input of the merge. A join is created to recombine output branches from the merge node and other merge nodes included in reconstructed paths. The output branches are synchronized so that all activated reconstructed paths must finish processing before a modeling element connected to an output of the join is executed.

20 Claims, 7 Drawing Sheets

METHOD AND SYSTEM FOR SYNCHRONIZING INCLUSIVE DECISION BRANCHES

FIELD OF THE INVENTION

The present invention relates to a system and method for analyzing and reconstructing a business process model having an inclusive decision, and more particularly to a technique for synchronizing branches of an inclusive decision in a business process model.

BACKGROUND OF THE INVENTION

An inclusive decision in a business process model is a decision that can go to multiple output branches (i.e., paths) of a process simultaneously. For example, there are four possibilities associated with a result of an inclusive decision having two output paths: (1) none of the two paths are activated; (2) the first path only is activated; (3) the second path only is activated; or (4) both paths are activated simultaneously. In conventional business process modeling, due to resource allocation and resource availability factors, there is no general technique for identifying which of the multiple output branches of an inclusive decision will last the longest. This difficulty in identifying which branch from an inclusive decision will last the longest interferes with waiting for all activated output branches to finish before proceeding to the next step in the process and creates a problem for the placement of stop nodes, which are required for successfully simulating the process. If two paths from an inclusive decision run simultaneously, the path that finishes first will cause the process to terminate before the other still running path finishes, thereby causing the process instance to fail. Reconstructing the inclusive decision as a merge node (i.e., a modeling element that waits for any incoming path to the merge node to finish processing) followed by a stop node or as a join node (i.e., a modeling element that waits for all incoming paths to the join node to finish processing, regardless of whether the path is activated or not activated) followed by a stop node is deficient because it does not provide the behavior of waiting specifically for all activated paths to finish processing. Further, the outputs of the parallel paths from an inclusive decision are not necessarily of the same data type and the conventional reconstruction schemes described above using a merge node or a join node cannot work with branches having outputs of different data types. Still further, creating a task with a single input criterion to synchronize flows does not yield a desired result because of the newly created task's limitation of starting only if all the parallel paths run simultaneously. Further yet, creating a task with multiple input criteria leads to undesirable ambiguous results in which the task is instantiated multiple times. For the example in which the inclusive decision has two output branches, a first input criterion with two inputs handles the case in which the two paths run simultaneously, a second input criterion with the first input only handles the case in which the first path runs alone, and a third input criterion with the second input only handles the case in which the second path runs alone. The ambiguity in the result of this example arises when the two paths run simultaneously and in general, do not finish at the same time. In this scenario, two of the input sets are satisfied, thereby causing the newly created task to run twice and produce the output twice, which is not the required behavior. Thus, there exists a need to overcome at least one of the preceding deficiencies and limitations of the related art.

SUMMARY OF THE INVENTION

The present invention provides a computer-implemented method of reconstructing an original process model that includes an inclusive decision into a reconstructed process model that includes a plurality of synchronized branches. The method includes a step of replacing the inclusive decision with a fork node in the reconstructed process model. The inclusive decision feeds m original paths in the original process model, where m>1. The m original paths are parallel paths capable of being activated. The m original paths are associated in a one-to-one correspondence with m activities. An activation of a first original path of the m original paths triggers an execution of a first activity of the m activities. The method further includes a step of reconstructing the first original path into a first reconstructed path of m reconstructed paths of the reconstructed process model. The first reconstructed path includes a first decision, the first activity, and a first merge node. The first decision includes a first output connected to the first activity. An output of the first activity is connected to a first input of the first merge node. The first decision further includes a second output connected to a second input of the first merge node. The method further includes a step of creating a join node having m input branches in the reconstructed process model. Connected to the m input branches of the join node are m output branches that include an output branch of the first merge node and at least one other output branch of at least one other merge node. The at least one other merge node is included in at least one other reconstructed path of the m reconstructed paths. An output of the join node is connected to a modeling element. The method further includes a step of storing the reconstructed process model in a computer data storage device and a step of synchronizing the m output branches in a simulation of a process represented by the reconstructed process model. The step of synchronizing includes waiting for a completion of processing of all activated reconstructed paths of the m reconstructed paths before executing an action associated with the modeling element.

A system and computer program product corresponding to the above-summarized methods are also described and claimed herein.

The present invention reconstructs an inclusive decision so that process flow reaches a stop node only after all the activated paths of the reconstructed inclusive decision have completed processing. The reconstruction of the inclusive decision disclosed herein facilitates readying a process for simulation and helps to ensure that simulated process instances succeed.

DETAILED DESCRIPTION OF THE INVENTION

Overview

Figure 1A:
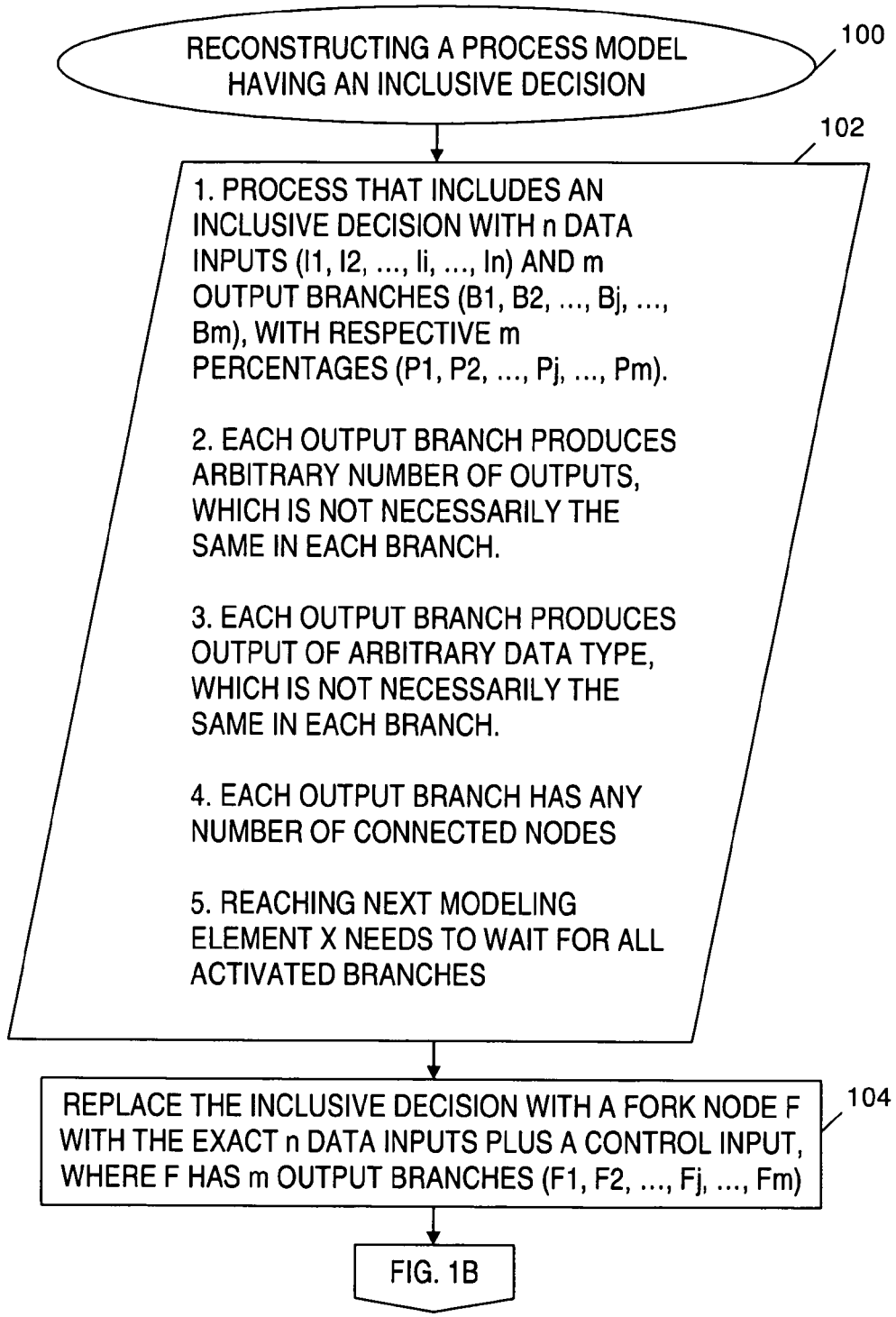
FIGS. 1A-1D depict a flowchart of a process for reconstructing a process model having an inclusive decision, in accordance with embodiments of the present invention.

The present invention may simulate a inclusive decision by replacing the inclusive decision with a fork, using a decision and a merge to reconstruct each branch of the inclusive decision, and using a join to synchronize all the reconstructed branches, so that a specified modeling element is reached in a process only after all reconstructed branches that indicate zero or more activated paths have completed processing. For a special case in which the specified modeling element is a stop node, no other modeling errors are present in the process, and proper simulation attributes are present, the simulation of the inclusive decision with the synchronization of the reconstructed branches may prepare the process for simulation so that all simulated process instances are successful.

DEFINITIONS

This section includes definitions of the following terms, which are used herein:

Activated path: a path that is being executed in a process instance.

Activity: an element in a process model that indicates where work is taking place in a process and that may execute as a result of a triggering event. An activity may be a task, a process, or a sub-process. An activity is represented as a node in a process model.

Branch: A distinct path leading to or originating from an element in a process model. Decisions and forks have one input branch and multiple output branches. Joins and merges have multiple input branches and one output branch.

Business item: a data item that travels from one activity to another activity in a process. A business item may be produced from one activity, stored in a local repository, and then retrieved from the repository and consumed by another activity.

Control input: input in a process model, where the input does not carry any data.

Control output: output in a process model, where the output does not carry any data.

Decision: an element of a process model that routes an input to one of several alternative outgoing paths depending on a condition.

Flow: the representation of interdependencies between activities in a structured format.

Fork: an element of a process model that splits a single path in a process into multiple parallel paths, where all of the multiple parallel paths are executed and enable multiple tasks to be performed in parallel. The fork copies its inputs and forwards the copies along each of the multiple parallel paths.

Inclusive decision: a decision element of process model by which a process can go to multiple output paths simultaneously.

Input node: an entry point through which an element of a process model is notified that it can start, typically because an upstream element on which the element depends has finished running. An input node may specify one or more required inputs. If the element has all of its required inputs, then the element starts.

Input branch: the branch of a decision, fork, join, or merge that contains the input node for the decision, fork, join, or merge.

Input criterion: a specification of a type of input required to start an activity.

Join: an element of a process model that recombines multiple parallel control flow paths that must all complete processing before a single control flow continues along a single path to a common process element. A join also synchronizes data flow by waiting for input to arrive at each of its incoming branches.

Local repository: a storage area for data that is available only within the local repository's own process. A local repository has a name and an associated type.

Merge: an element of a process model that recombines multiple paths, usually after a decision. A merge waits for any incoming path to the merge to finish processing.

Node: a representation (e.g., shape or icon) of any element of a process model, such as a shape that represents a task, a decision, a fork, a merge, a process, a sub-process, a start node or a stop node.

Output node: an exit point through which an element of a process model can inform downstream element(s) that they can start.

Output branch: the branch of a decision, fork, join, or merge that contains the output node for the decision, fork, join, or merge.

Output criterion: a specification of a type of output required for completion of an activity.

Path: a set of linked, chronologically-ordered activities that forms a route that a flow may take in a process model. The chronological order of activities of a path may be from left to right.

Process (a.k.a. business process): a defined flow of activities (e.g., tasks or other processes) that provides a business value by transforming an input to an output. The activities are linked with connectors that define the chronological order of the activities.

Process instance: a manifestation of a modeled process that is created in a simulated or a real environment.

Process model: a representation of a process developed for understanding, analysis, improvement and/or replacement of the process. A process model may be a container of processes and other process models that may be used to categorize processes in hierarchies of process models and processes. A process model may be simulated by determining an estimated duration and a cost of resources consumed during each activity, and attaching the estimated duration and cost to each activity and to the output of each conditional branch.

Resource: a person, equipment or material used to perform a task.

Simulation: a faster-than-real-time performance of a process in a virtual environment. Simulation enables organizations to observe how a process will perform in response to variations of inputs to the process, just as in a real-life work environment. Simulation output provides detailed information regarding resource utilization levels and the results of cost and cycle-time calculations.

Start node: a node that identifies the beginning of a process whenever the process is not started by another process.

Stop node: a node that identifies the end of a process. When a flow reaches a stop node while the process is running, the process immediately terminates, even if there are other currently executing flows within the process.

Task: a primitive activity that is a basic building block of a process model. A task cannot be further decomposed into lower-level activities (e.g., a lower level of work). Each task performs some function.

Inclusive Decision Reconstruction Process

FIGS. 1A-1D depict a flowchart of a process for reconstructing a process model having an inclusive decision, in accordance with embodiments of the present invention. Hereinafter, the process of FIGS. 1A-1D is also referred to as the reconstruction process. The reconstruction process begins at step 100 in FIG. 1A.

Figure 4:
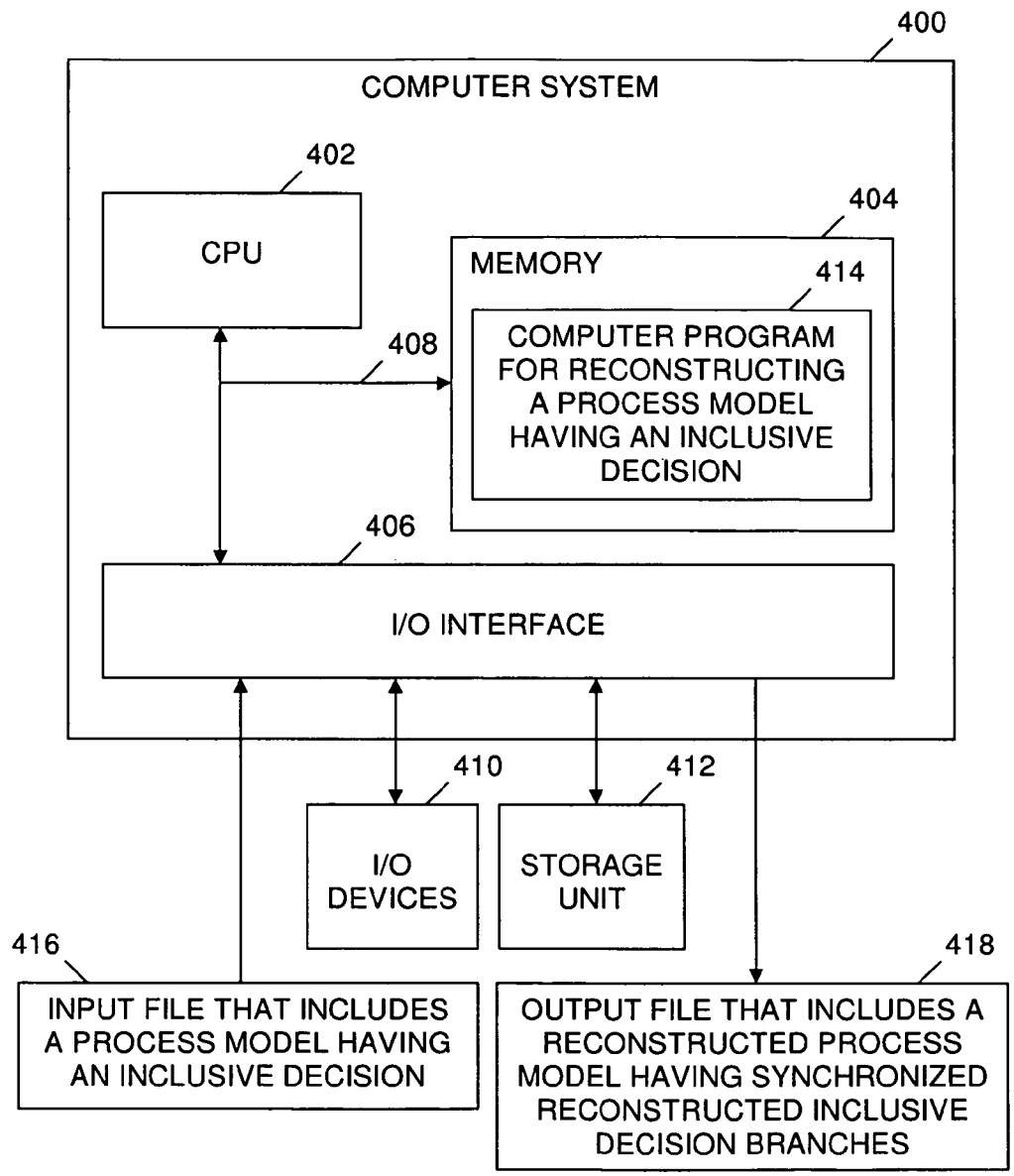
FIG. 4 is a block diagram of a computer system that implements the process of FIGS. 1A-1D, in accordance with embodiments of the present invention.

In step 102, input to the reconstruction process is received by a computer system (see computer system 400 in FIG. 4). The input to the reconstruction process includes an original process model (a.k.a. business process model or the input process) that includes an inclusive decision with n number of data inputs (i.e., I1, I2, . . . , Ii, . . . In, where n≧1) and m number of output branches (i.e., B1, B2, . . . , Bj, . . . , Bm, where m>1 and 1≦j≦m) with respective m number of percentages (i.e., P1, P2, . . . , Pj, . . . , Pm). The percentage Pj indicates the likelihood of activating respective output branch Bj.

Requirements of the input in step 102 include: (1) each output branch produces an arbitrary number of data outputs, where the number of data outputs is not necessarily the same in each output branch; (2) each output branch produces output of an arbitrary data type, where the data type is not necessarily the same in each output branch; (3) each output branch has any number of connected nodes which are not necessarily tasks (i.e., each node in an output branch may be any decision, any event such as a stop node, or any transaction or activity such as a process, sub-process, or task), where the number of connected nodes is not necessarily the same in each output branch; and (4) before reaching a next modeling element X, the business process must wait for a completion of all activated paths (i.e., activated output branches) or a determination that there are zero activated paths. The number of activated paths from the inclusive decision is greater than or equal to zero and less than or equal to m.

In one embodiment, the m output branches (i.e., paths) are associated with m activities in a one-to-one correspondence, where an activation of an output branch of the m output branches triggers the execution of the corresponding activity of the m activities.

The steps that follow in the process of FIGS. 1A-1D are described as being performed automatically by a software-based inclusive decision reconstruction program (see, e.g., computer program 414 in FIG. 4). In an alternate embodiment, the steps that follow in FIGS. 1A-1D are performed manually.

In step 104, the inclusive decision reconstruction program replaces the inclusive decision in the input process with a Fork node F with the exact n data inputs. If the inclusive decision did not include a control input prior to step 104, then the Fork node F is added with a new control input. If the inclusive decision included a control input prior to step 104, then the control input is retained as a control input to the Fork node F. The Fork node is defined in step 104 to have m number of output branches (F1, F2, . . . , Fj, . . . , Fm), again where m>1.

Figure 1B:
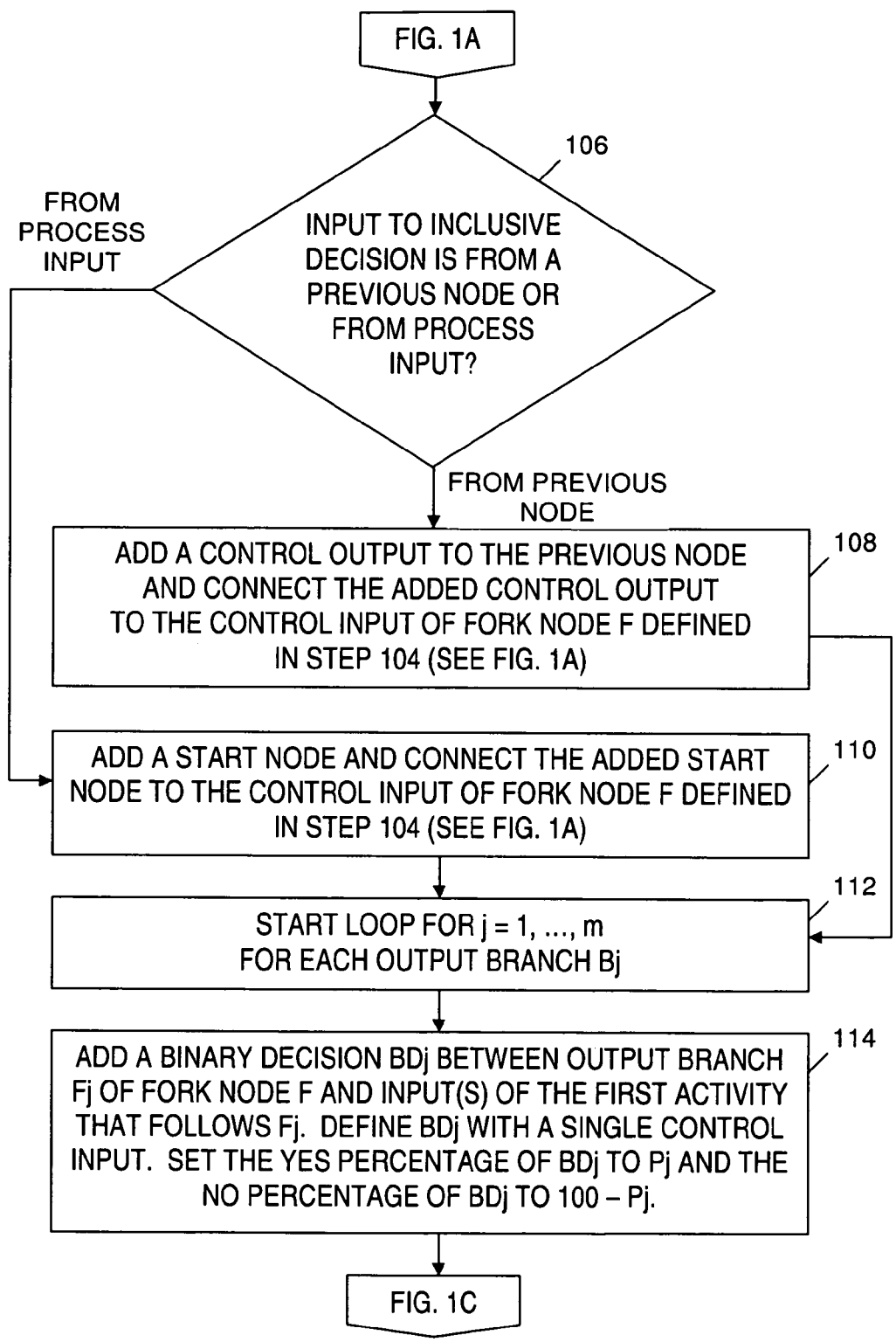

The reconstruction process continues with step 106 of FIG. 1B. If the inclusive decision reconstruction program determines in step 106 that the input to the inclusive decision is from a previous node in the input process, then in step 108 the inclusive decision reconstruction program adds a control output to the aforementioned previous node and connects the added control output to the control input of the Fork node F defined in step 104 (see FIG. 1A). As used in this paragraph, a previous node is a node in the original process model that is connected to and upstream from the inclusive decision.

If the inclusive decision reconstruction program determines in step 106 that the input to the inclusive decision is from the input to the business process model, then in step 110 the inclusive decision reconstruction program adds a start node and connects the added start node to the control input of the Fork node F defined in step 104 (see FIG. 1A).

Step 112 follows both step 108 and step 110. In step 112, a loop starts for j=1, . . . , m for each output branch Bj. Step 114 in FIG. 1B and steps 116, 118, 120, 122, 124, 126 and 128 in FIG. 1C are included in the loop.

In step 114, the inclusive decision reconstruction program adds a binary decision (i.e., an exclusive decision with two branches) BDj between output branch Fj of Fork node F and the input(s) of the first activity that follows the output branch Fj. That is, step 114 adds the binary decision BDj between Fj and the input(s) of the output branch Bj of the original process model. The added binary decision BDj is defined to have a Yes percentage, a No percentage, and a single control input. Also in step 114, the inclusive decision reconstruction program sets the Yes percentage of BDj to Pj, and the No percentage of BDj to 100%−Pj. The Yes percentage indicates the likelihood that the condition associated with the binary decision is true. The No percentage indicates the likelihood that the condition associated with the binary decision is false.

Figure 1C:
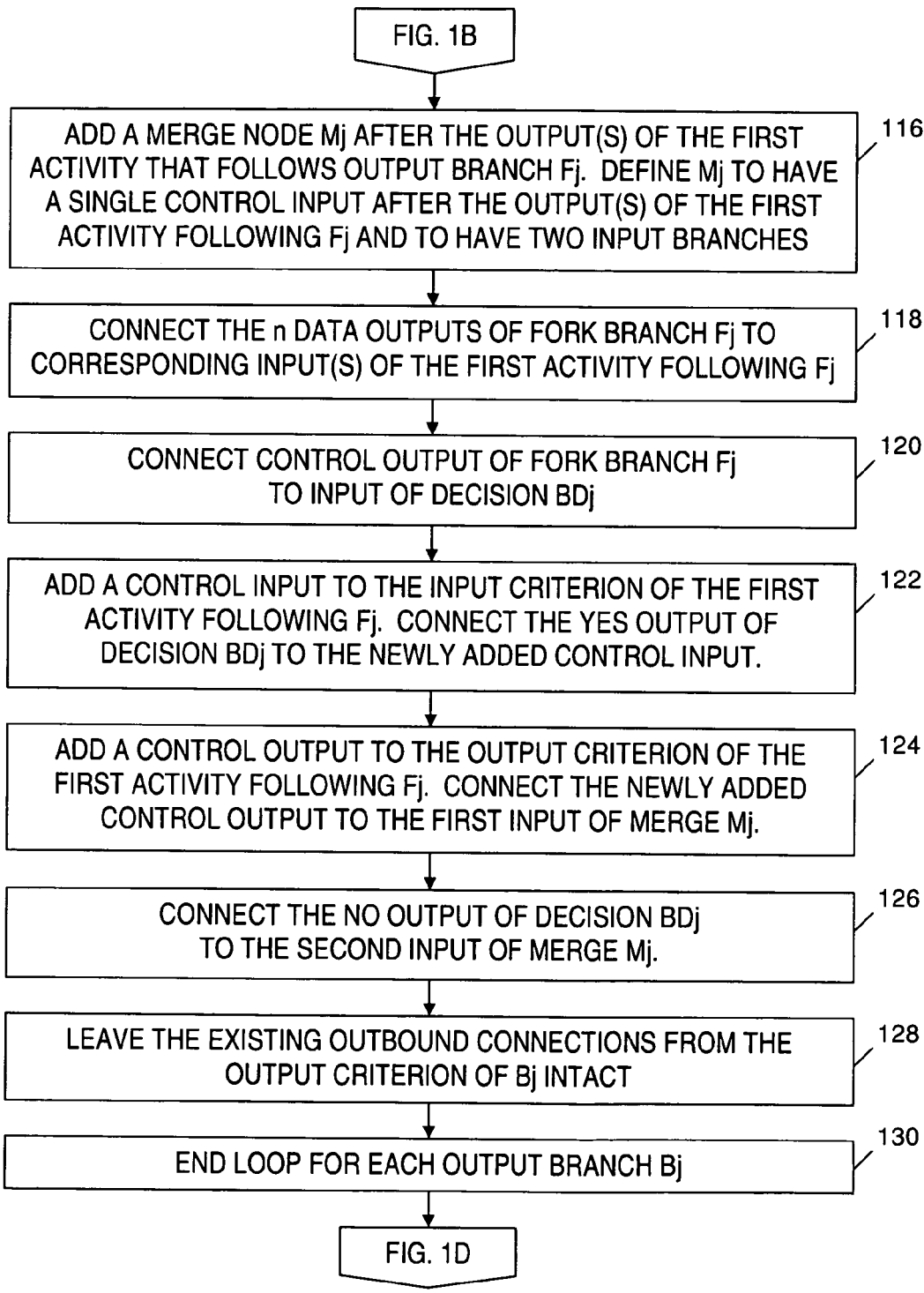

In step 116 of FIG. 1C, the inclusive decision reconstruction program adds a Merge node Mj after the output(s) of the first activity that follows the output branch Fj. That is, step 116 adds Mj after the output(s) of output branch Bj. The Merge node Mj is defined in step 116 to have a single control input after the output(s) of the first activity that follows the output branch Fj. Step 116 further defines Merge node Mj to have two input branches (i.e., the first input of Mj and the second input of Mj).

In step 118, the inclusive decision reconstruction program connects the n data flow outputs of output branch Fj to n corresponding data flow input(s) of the first activity that follows the output branch Fj. That is, step 118 connects the n data flow outputs of Fj to data flow input(s) of output branch Bj of the original process flow. In step 120, the inclusive decision reconstruction program connects the control flow output of output branch Fj to the input of binary decision BDj.

In step 122, the inclusive decision reconstruction program adds a control input to the input criterion (i.e., input node) of the first activity that follows the output branch Fj. That is, step 122 adds a control input to the input criterion of output branch Bj. Furthermore, the inclusive decision reconstruction program connects the Yes output of binary decision BDj to the newly added control input in step 122. The Yes output is the output of BDj that is associated with the Yes percentage (see step 114 of FIG. 1B).

In step 124, the inclusive decision reconstruction program adds a control output to the output criterion (i.e., output node) of the first activity that follows the output branch Fj. That is, step 124 adds a control output to the output criterion of output branch Bj. Also in step 124, the inclusive decision reconstruction program connects the newly added control output to the first input of Merge node Mj.

In step 126, the inclusive decision reconstruction program connects the No output of binary decision BDj to the second input of Merge node Mj. The No output is the output of BDj that is associated with the No percentage (see step 114 of FIG. 1B). In step 128, the inclusive decision reconstruction program leaves any existing outbound connection(s) from the output criterion of output branch Bj intact. In step 130, the aforementioned loop (see step 112 of FIG. 1B) ends.

Figure 1D:
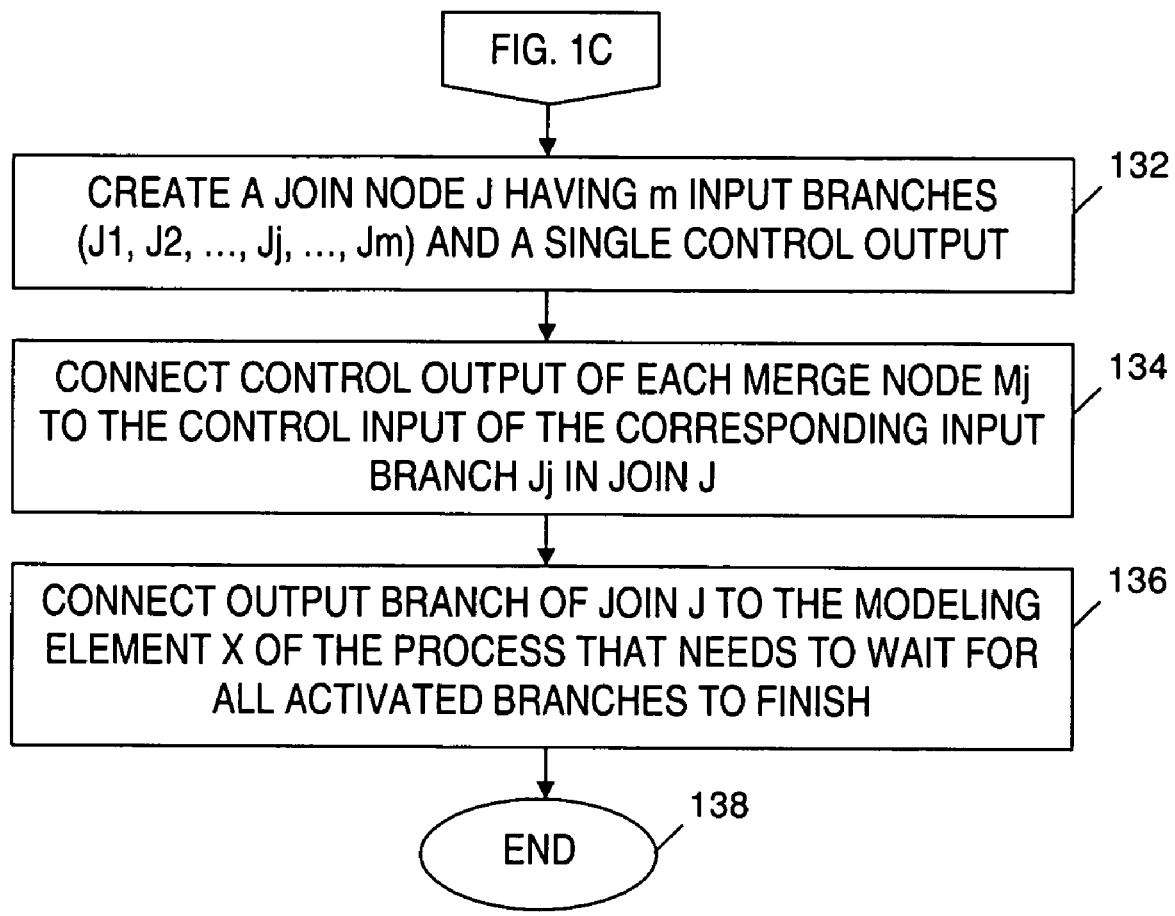

In step 132 of FIG. 1D, the inclusive decision reconstruction program creates a Join node J having m number of input branches (i.e., J1, J2, . . . , Jj, . . . , Jm), m control inputs associated with the m input branches J1, . . . , Jm in a one-to-one correspondence, and a single control output. In step 134, the inclusive decision reconstruction program connects control output of each Merge node Mj to the control input of the corresponding input branch Jj in Join node J.

In step 136, the inclusive decision reconstruction program connects output branch of Join node J to the next modeling element X of the business process model. Modeling element X may be any element of a process model, such as a stop node, decision, process, task, etc. The result of step 136 is a reconstructed process model (i.e., a reconstruction of the process model input in step 102 of FIG. 1A), in which processing of modeling element X waits for the completion of all activated branches of the reconstructed process model. The reconstruction process of FIGS. 1A-1D ends at step 138.

After step 136, the reconstruction program stores the reconstructed process model in an output file in a computer data storage device. The output file is described in the discussion of FIG. 4, which is presented below.

After step 136, a computer system may execute a simulation of the process represented by the reconstructed process model. The simulation includes synchronizing the m output branches F1, . . . , Fm so that the simulated process waits for all activated paths included in F1, . . . , Fm to finish processing before performing an action represented by the modeling element X. After the simulation, development software (e.g., WebSphere® Integration Developer offered by International Business Machines Corporation) may be used to assemble assets necessary to support the process (e.g., each activity in the process model may be associated with a software component developed to provide an implementation of the process).

In one embodiment, the Yes branch of a j-th binary decision BDj added in step 114 (see FIG. 1B) triggers the j-th path of m parallel paths corresponding to m original parallel paths fed by the inclusive decision included in the input in step 102 (see FIG. 1A). At the end of the j-th path is a control output added in step 124 (see FIG. 1C), where the control output triggers a j-th merge node Mj added in step 116 (see FIG. 1C) via a connection made in step 124 (see FIG. 1C) between the control output and a first input of Mj. In the case in which the j-th path is not activated, the No branch of BDj triggers Mj via a connection made in step 126 (see FIG. 1C) between the No output of BDj and the second input of Mj. Using the Yes and No branches of BDj to trigger Mj in the aforementioned way ensures that Mj is always triggered, regardless of whether or not the j-th path is activated. Further, a join node created in step 132 (see FIG. 1D) waits for all m merge nodes including Mj; therefore, when the process reaches the join node it is ensured that all of the m parallel paths that were activated have been completed, thereby synchronizing the m parallel paths. Still further, the join node may be connected to a stop node, which ensures that the process safely stops after all the paths that were run (i.e., activated) finish processing without causing a process instance to fail.

EXAMPLE

Figure 2:
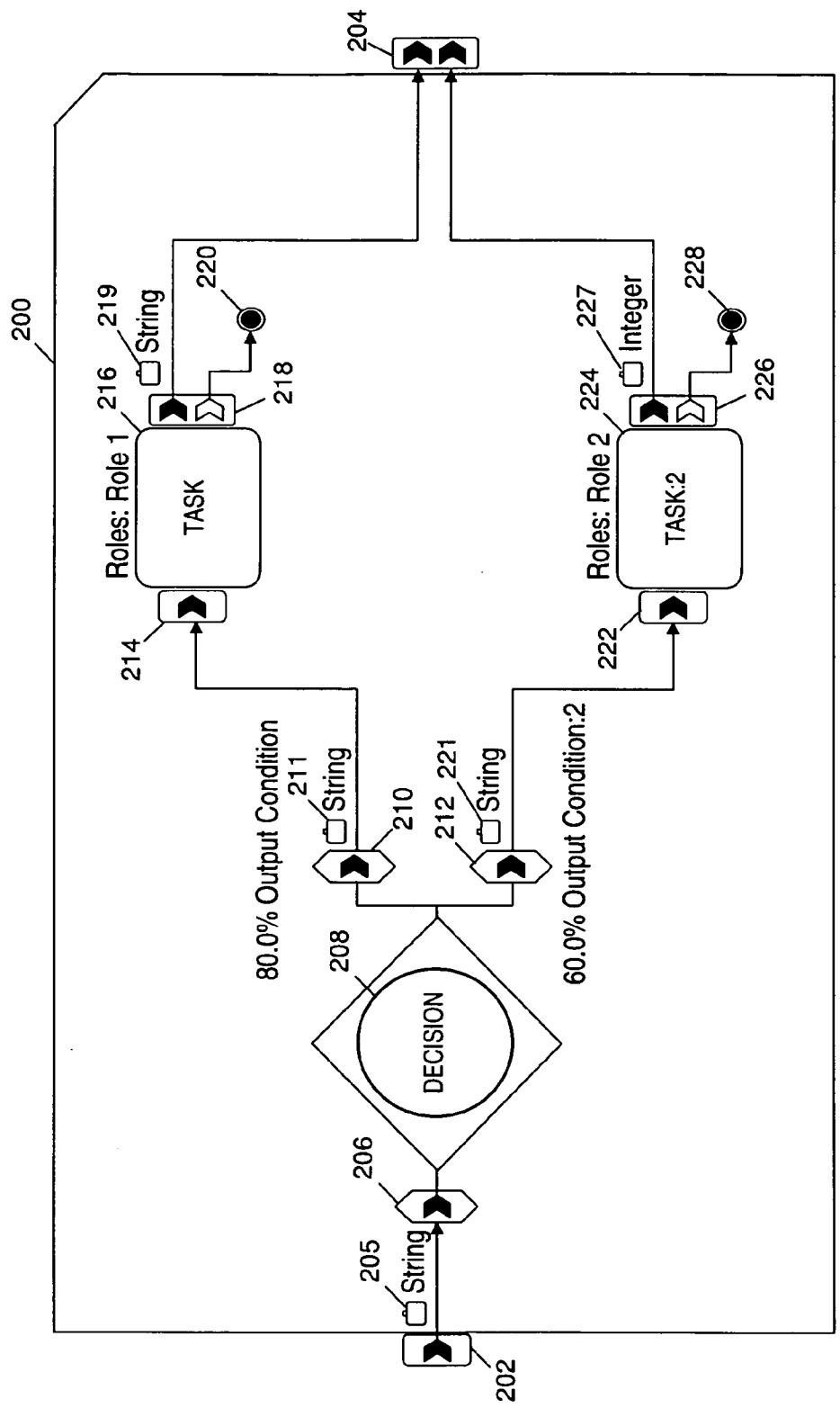
FIG. 2 is an example of an initial process model that includes an inclusive decision whose branches are to be reconstructed and synchronized by the process of FIGS. 1A-1D, in accordance with embodiments of the present invention.

FIG. 2 is an example of an initial process model that includes an inclusive decision whose branches are to be reconstructed and synchronized by the process of FIGS. 1A-1D, in accordance with embodiments of the present invention. Process model 200 receives input from process input node 202 and generates process output 204. The initial flow of data in process model 200 is a receipt of a business item 205 from process input node 202. Business item 205 is a string type of data. The data flow of process model 200 continues to an input node 206 of an inclusive decision 208, which feeds two parallel paths via two output nodes: a first output node 210 with Output Condition and a second output node 212 with Output Condition:2. Because decision 208 is inclusive, there are four possibilities for which path(s), if any, are activated: (1) None of the two paths are activated; (2) the first path (i.e., via output node 210) only is activated; (3) the second path (i.e., via output node 212) only is activated; or (4) both paths are activated.

A business item 211 flows to an input node 214 of a first task 216 (i.e., TASK). Business item 211 is a string type of data. First task 216 generates an output 218 having a data flow output (i.e., the black arrow icon in the upper portion of output 218) and a control flow output (i.e., the white arrow icon in the lower portion of output 218). A business item 219 (i.e., a string type of data) flows from the data flow output of output 218 to process output 204.

Control flows from the control flow output of output 218 to a stop node 220, at which the control flow of process model 200 stops.

A business item 221 flows to an input node 222 of a second task 224 (i.e., TASK:2). Business item 221 is data of string type. Second task 224 generates an output 226 having a data flow output (i.e., the black arrow icon in the upper portion of output 226) and a control flow output (i.e., the white arrow icon in the lower portion of output 226). A business item 227 (i.e., an integer type of data) flows from the data flow output of output 226 to process output 204.

Control flows from the control output of output 226 to a stop node 228, at which the control flow of process model 200 stops.

Figure 3:
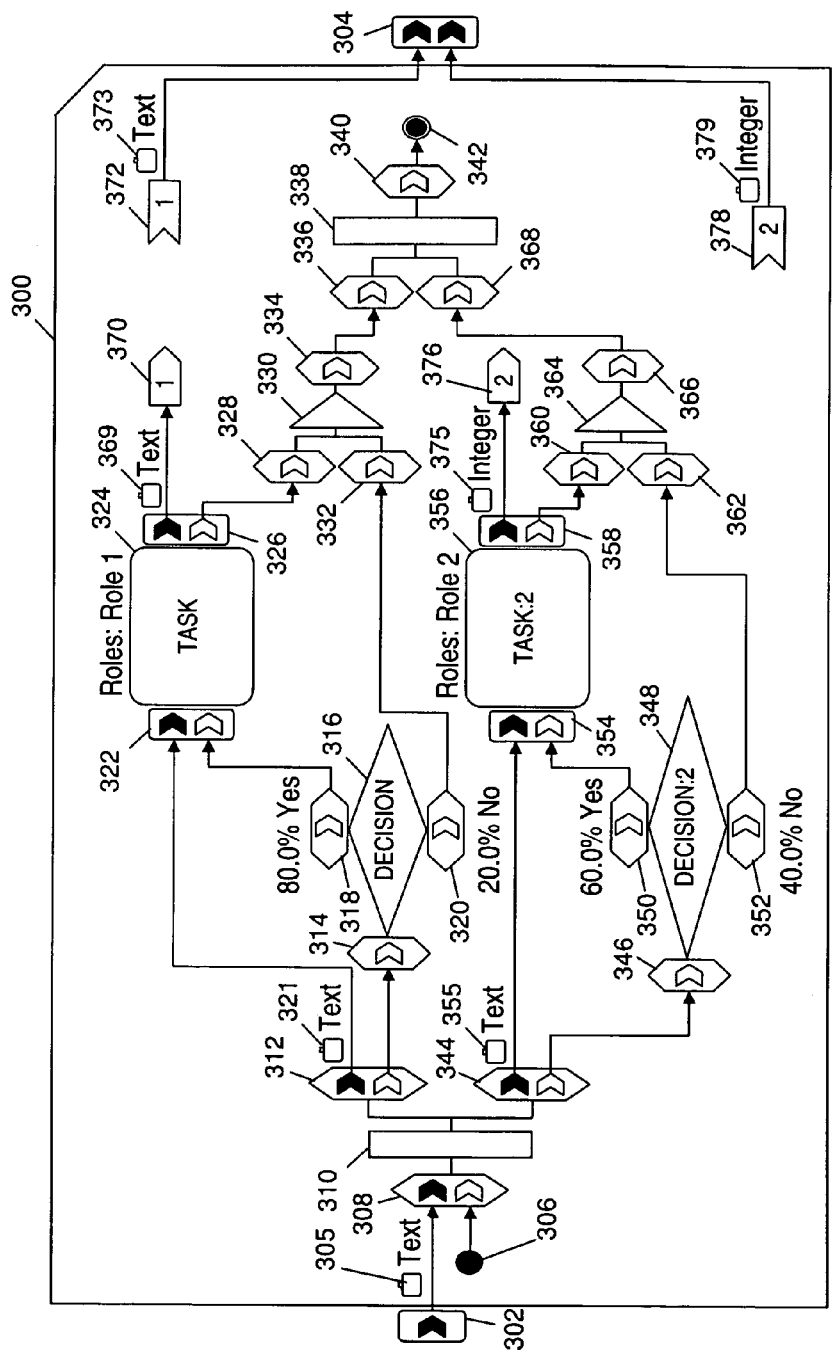
FIG. 3 is an example of a reconstructed process model resulting from the process of FIGS. 1A-1D, in accordance with embodiments of the present invention.

FIG. 3 is an example of a reconstructed process model resulting from the process of FIGS. 1A-1D, in accordance with embodiments of the present invention. A process model 300 is a result of reconstructing process model 200 (see FIG. 2) with the process of FIGS. 1A-1D to synchronize the output branches of inclusive decision 208 (see FIG. 2), so that the reconstructed process waits for all paths in a set of activated paths to finish, where the set of activated paths indicates zero activated paths, one activated path, or two activated paths from inclusive decision 208 (see FIG. 2).

Process model 300 receives input from a process input node 302 and generates a process output 304, which are equivalent to process input node 202 (see FIG. 2) and process output 204 (see FIG. 2). Data flow in process model 300 is initiated by a receipt of a business item 305 from process input node 302. A start node 306 initiates a control flow in process model 300. Data flow from process input node 302 and control flow from start node 306 are received at an input node 308 to fork 310.

A first output node 312 of fork 310 generates a first parallel branch from fork 310. Output node 312 includes a control flow output indicated by a white arrow. Control flow from output node 312 proceeds to an input node 314 of a first binary decision 316, which has a Yes output 318 and a No output 320. Control flow via Yes output 318 proceeds to an input node 322 of a first task 324. First task 324 is equivalent to first task 216 (see FIG. 2). First task 324 has an output node 326, which includes a data flow output (i.e., represented by the black arrow in the upper portion of output node 326) and a control flow output (i.e., represented by the white arrow in the lower portion of output node 326). Control flow from output node 325 proceeds to a first input node 328 of a first merge node 330. Control flow via No output 320 proceeds to a second input node 332 of first merge node 330. Control flow via an output node 334 of first merge node 330 proceeds to a first input node 336 of a join node 338. Control flow via an output node 340 of join node 338 proceeds to a stop node 342. In another example of a reconstruction of inclusive decision 208 (see FIG. 2), stop node 342 may be replaced with another modeling element, such as a task, a decision, a process, etc.

A second output node 344 of fork 310 generates a second parallel branch from fork 310. Control flow from output node 344 proceeds to an input node 346 of a second binary decision 348, which has a Yes output 350 and a No output 352. Control flow via Yes output 350 proceeds to an input node 354 of a second task 356. Second task 356 is equivalent to second task 224 (see FIG. 2). Second task 356 has an output node 358, which includes a data flow output indicated by the black arrow in the upper portion of output node 358 and a control flow output indicated by the white arrow in the lower portion of output node 358. Control flow from output node 358 proceeds to a first input node 360 of a second merge node 364. Control flow via No output 352 proceeds to a second input node 362 of second merge node 364. Control flow via an output node 366 of second merge node 364 proceeds to a second input node 368 of join node 338. Again, control flow via an output node 340 of join node 338 proceeds to a stop node 342.

Data flow from output node 326 includes a business item 369 (i.e., data of type text) that proceeds to connector 370, and subsequently to connector 372. Data flow from connector 72 includes a business item 373 (i.e., data of type text) and proceeds to process output 304.

Data flow from output node 358 includes a business item 375 (i.e., data of type integer) that proceeds to connector 376, and subsequently to connector 378. Data flow from connector 378 includes a business item 379 (i.e., data of type integer) and proceeds to process output 304.

The following description (a.k.a. reconstruction example) describes how the process model example of FIG. 2 is reconstructed into the process model example of FIG. 3 by performing the process of FIGS. 1A-1D. Although steps from FIGS. 1A-1D are referenced in this section, the steps of FIGS. 1A-1D are not limited to the reconstruction example. Inclusive decision 208 (see FIG. 2) includes one data input and two output branches. Thus, in step 102 (see FIG. 1A) for the example of this section, n data inputs is equal to 1 data input, m output branches is equal to 2 output branches, B1 is the output branch starting at output node 210 (see FIG. 2), and B2 is the output branch starting at output node 212. Further, percentage P1 corresponding to B1 is 80.0% (see FIG. 2) and percentage P2 corresponding to B2 is 60.0% (see FIG. 2).

In step 104 (see FIG. 1A) for the example in this section, fork node 310 with one data input (i.e., the black arrow in the upper portion of input node 308) and one control input (i.e., the white arrow in the lower portion of input node 308) replaces inclusive decision 208 (see FIG. 2). Also in step 104 (see FIG. 1A), fork node 310 is defined to have m (i.e., 2) output branches, F1 and F2 (i.e., output nodes 312 and 344, respectively).

In step 106 (see FIG. 1B) for the example in this section, the inclusive decision reconstruction program determines that the input to inclusive decision 208 (see FIG. 2) is from process input node 302 rather than from a previous node within process model 200 (see FIG. 2). Based on this determination in step 106 (see FIG. 1B), step 110 (see FIG. 1B) adds start node 306 and connects start node 306 to the control input of input node 308 of fork 310.

Starting a first iteration of a loop for j=1, ..., m (i.e., for j=1 in a first iteration and for j=2 in a second iteration) in step 112 (see FIG. 1B) for the example of this section, step 114 (see FIG. 1B) adds a binary decision BD1 (i.e., first binary decision 316) between output branch F1 (i.e., output node 312) of fork 310 and the inputs (i.e., input node 322) of the first activity (i.e., first task 324) that follows the output branch F1. Also in step 114 for the example of this section, the Yes percentage of first binary decision 316 is set to P1 (i.e., 80.0%) and the No percentage of first binary decision 316 is set to 100−P1 (i.e., 100−80.0% or 20.0%). Further, first binary decision 316 is defined in step 114 (see FIG. 1B) to have a single control input (i.e., the white arrow in input node 314).

Continuing the first iteration of the loop started in step 112 (see FIG. 1B), step 116 (see FIG. 1C) in the example of this section adds a merge node M1 (i.e., merge node 330) after the outputs (i.e., output node 326) of the first activity (i.e., first task 324) that follows the output branch F1 (i.e., output node 312). Merge node 330 is specified in step 116 (see FIG. 1C) to have a single control input (i.e., the white arrow in input node 328) after the outputs (i.e., output node 326) of the first activity (i.e., first task 324) that follows the output branch F1 (i.e., output node 312). Merge node 330 is also specified in step 116 (see FIG. 1C) to have two input branches (i.e., branches via input nodes 328 and 332).

For the example of this section, step 118 (see FIG. 1C) connects the one data output of output branch F1 (i.e., the black arrow in the upper portion of output node 312) of fork 310 to the corresponding one data input (i.e., the black arrow of input node 322) of first activity (i.e., first task 324) that follows the output branch F1.

In step 120 (see FIG. 1C) for the example of this section, the control output of output branch F1 (i.e., the white arrow in the lower portion of output node 312) is connected to the input (i.e., input node 314) of binary decision BD1 (i.e., first binary decision 316).

For the example of this section, step 122 (see FIG. 1C) adds a control input to the input criterion (i.e., input node 322) of the first activity (i.e., first task 324) that follows the output branch F1 (i.e., output node 312) and connects the Yes output (i.e., output 318) of binary decision BD1 (i.e., first binary decision 316) to the aforementioned control input added to input node 322.

In step 124 (see FIG. 1C) for the example in this section, a control output is added to the output criterion (i.e., output node 326) of the first activity (i.e., first task 324) that follows the output branch F1 (i.e., output node 312) and the added control output (i.e., white arrow of output node 326) is connected to the first input of merge node M1 (i.e., first input node 328 of first merge node 330).

For the example of this section, step 126 (see FIG. 1C) connects the No output (i.e., output 320) of binary decision BD1 (i.e., first binary decision 316) to the second input (i.e., input node 332) of merge node M1 (i.e., merge node 330).

In step 128 (see FIG. 1C) for the example of this section, the existing outbound connection from the output criterion (i.e., output node 326) of the first activity (i.e., first task 324) that follows the output branch F1 (i.e., output node 312) is left intact. That is, the connection from the black arrow indicating data output in output node 326 to the upper arrow in process output 304 is left intact.

The loop started in step 112 (see FIG. 1B) performs a second iteration with j=2. In the second iteration of the loop, step 114 (see FIG. 1B) adds a binary decision BD2 (i.e., second binary decision 348) between output branch F2 (i.e., output node 344) of fork 310 and the inputs (i.e., input node 354) of the first activity (i.e., second task 356) that follows the output branch F2. Also in step 114 for the second iteration of the loop, the Yes percentage of second binary decision 348 is set to P2 (i.e., 60.0%) and the No percentage of second binary decision 348 is set to 100−P2 (i.e., 100−60.0% or 40.0%). Further, second binary decision 348 is defined in step 114 (see FIG. 1B) to have a single control input (i.e., the white arrow in input node 346).

Continuing the second iteration of the loop started in step 112 (see FIG. 1B), step 116 (see FIG. 1C) in the example of this section adds a merge node M2 (i.e., merge node 364) after the outputs (i.e., output node 358) of the first activity (i.e., second task 356) that follows the output branch F2 (i.e., output node 344). Merge node 364 is specified in step 116 (see FIG. 1C) to have a single control input (i.e., the white arrow in input node 360) after the outputs (i.e., output node 358) of the first activity (i.e., second task 356) that follows the output branch F2 (i.e., output node 344). Merge node 364 is also specified in step 116 (see FIG. 1C) to have two input branches (i.e., branches via input nodes 360 and 362).

In the second iteration of the loop, step 118 (see FIG. 1C) connects the one data output of output branch F2 (i.e., the black arrow in the upper portion of output node 344) of fork 310 to the corresponding one data input (i.e., the black arrow of input node 354) of first activity (i.e., second task 356) that follows the output branch F2.

In step 120 (see FIG. 1C) for the second iteration of the loop, the control output of output branch F2 (i.e., the white arrow in the lower portion of output node 344) is connected to the input (i.e., input node 346) of binary decision BD2 (i.e., second binary decision 348).

In the second iteration of the loop, step 122 (see FIG. 1C) adds a control input to the input criterion (i.e., input node 354) of the first activity (i.e., second task 356) that follows the output branch F2 (i.e., output node 344) and connects the Yes output (i.e., output 350) of binary decision BD2 (i.e., second binary decision 348) to the aforementioned control input added to input node 354.

In step 124 (see FIG. 1C) for the second iteration of the loop, a control output is added to the output criterion (i.e., output node 358) of the first activity (i.e., second task 356) that follows the output branch F2 (i.e., output node 344) and the added control output (i.e., white arrow of output node 358) is connected to the first input of merge node M2 (i.e., first input node 360 of second merge node 364).

In the second iteration of the loop, step 126 (see FIG. 1C) connects the No output (i.e., output 352) of binary decision BD2 (i.e., second binary decision 348) to the second input (i.e., input node 362) of merge node M2 (i.e., merge node 364).

In step 128 (see FIG. 1C) in the second iteration of the loop, the existing outbound connection from the output criterion (i.e., output node 358) of the first activity (i.e., second task 356) that follows the output branch F2 (i.e., output node 344) is left intact. That is, the connection from the black arrow indicating data output in output node 358 to the lower arrow in process output 304 is left intact.

Following step 128 (see FIG. 1C) of the second iteration of the loop, step 130 (see FIG. 1C) ends the loop. In step 132 (see FIG. 1D) for the example of this section, a join node J (i.e., join node 338) is created and specified as having two input branches (i.e., J1 and J2), control inputs in input nodes 336 and 368, and a single control output in output node 340. The control input in input node 336 is the control input of corresponding input branch J1 and the control input in input node 368 is the control input of corresponding input branch J2.

In step 134 (see FIG. 1D) for the example of this section, the control output (i.e., output node 334) of merge node M1 (i.e., first merge node 330) and the control output (i.e., output node 366) of merge node M2 (i.e., second merge node 364) are respectively connected to the control input of J1 (i.e., input node 336) and the control input of J2 (i.e., input node 368).

In step 136 (see FIG. 1D) for the example in this section, the output branch of join node 338 (i.e., the branch via output node 340) is connected to stop node 342 and the reconstruction example ends at step 138 (see FIG. 1D).

As described above, the Yes output 318 of first binary decision 316 triggers the first path of the two parallel paths that originally were fed from inclusive decision 208 (see FIG. 2) prior to the reconstruction of process model 200 (see FIG. 2). At the end of the first path is a control output in output node 326 to trigger the first merge node 330. In the case in which the first path is not activated, the No output 320 of first binary decision 316 triggers first merge node 330. Using the Yes and No branches of first binary decision 316 in the aforementioned way ensures that first merge node 330 is always triggered, regardless of whether the first path is activated. Similarly, the Yes output 350 of second binary decision 348 triggers the second path of the two parallel paths originally fed from inclusive decision 208 (see FIG. 2). At the end of the second path is a control output in output node 358 to trigger the second merge node 364. In the case in which the second path is not activated, the No output 352 of second binary decision 348 triggers second merge node 364. Thus, the second merge node 364 is always triggered, regardless of whether the second path is activated. Since the join node 338 waits for all the merge nodes, the process model 300 ensures that, upon reaching the join node 338, all paths that were activated have been completed, thereby synchronizing the activated paths. The join node 338 is connected to a stop node 342, which safely stops the process after all the branches that were run finish processing.

Inclusive Decision Reconstruction System

FIG. 4 is a block diagram of a computer system that implements the process of FIGS. 1A-1D, in accordance with embodiments of the present invention. Computer system 400 generally comprises a central processing unit (CPU) 402, a memory 404, an input/output (I/O) interface 406, and a bus 408. Further, computer system 400 is coupled to I/O devices 410 and a computer data storage unit 412. CPU 402 performs computation and control functions of computer system 400. CPU 402 may comprise a single processing unit, or be distributed across one or more processing units in one or more locations (e.g., on a client and server).

Memory 404 may comprise any known type of computer data storage media, including bulk storage, magnetic media, optical media, random access memory (RAM), read-only memory (ROM), a data cache, a data object, etc. In one embodiment, cache memory elements of memory 404 provide temporary storage of at least some program code (e.g., code 414) in order to reduce the number of times code must be retrieved from bulk storage during execution. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 400, and may comprise any type of transmission link, including electrical, optical, wireless, etc.

I/O interface 406 also allows computer system 400 to store and retrieve information (e.g., data or program instructions such as code 414) from an auxiliary storage device such as computer data storage unit 412 or another computer data storage unit (not shown). Computer data storage unit 412 may be a non-volatile storage device, such as a magnetic disk drive (i.e., hard disk drive) or an optical disc drive (e.g., a CD-ROM drive which receives a CD-ROM disk).

Memory 404 includes computer program code 414 that provides the logic for reconstructing a process model having an inclusive decision. In one embodiment, code 414 provides logic for the process of FIGS. 1A-1D. Further, memory 404 may include other systems not shown in FIG. 4, such as an operating system (e.g., Linux) that runs on CPU 402 and provides control of various components within and/or connected to computer system 400.

Memory 404, computer data storage unit 412, and/or one or more other computer data storage units (not shown) that are coupled to computer system 400 may store computer program 414. Furthermore, memory 404, computer data storage unit 412, and/or one or more other computer data storage units (not shown) that are coupled to computer system 400 may store an input file 416 that includes a process model having an inclusive decision and an output file 418 that includes a reconstructed process model having synchronized reconstructed inclusive decision branches resulting from the process of FIGS. 1A-1D. In one embodiment, input file 416 and output file 418 are different computer files. In another embodiment, input file 416 and output file 418 are the same computer file. As one example, input file 416 and output file 418 include process models in a format that may be imported into WebSphere® Business Modeler, which is a software tool that models, validates, documents, simulates, analyzes and redesigns process models. WebSphere® Business Modeler is offered by International Business Machines Corporation located in Armonk, N.Y.

In one embodiment, prior to the execution of the process of FIGS. 1A-1D, computer system 400 is coupled to a computer data storage device (e.g. storage unit 412) that includes input file 416 and no computer data storage device coupled to computer system 400 includes output file 418. By the process of FIGS. 1A-1D, computer system 400 is transformed into a system that is coupled to a computer data storage device that includes output file 418.

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., FIG. 4, generally, or computer system 400). Furthermore, an embodiment of the present invention may take the form of a computer program product embodied in any tangible medium of expression (e.g., memory 404 or computer data storage unit 412) having computer-readable program code (e.g., code 414) embodied or stored in the tangible medium. The computer-readable program code may comprise an algorithm configured to implement a method of reconstructing a process model having an inclusive decision (e.g., the method of FIGS. 1A-1D). The computer-readable program code may contain instructions configured to be executed by CPU 402 to implement a method of reconstructing a process model having an inclusive decision (e.g., the method of FIGS. 1A-1D).

Any combination of one or more computer-usable or computer-readable medium(s) (e.g., memory 404 and computer data storage unit 412) may be utilized. The computer-usable or computer-readable medium may be, for example but not limited to, an electronic, magnetic, optical, electromagnetic, infrared or semiconductor system, apparatus, or device. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program 414 is printed, as the program 414 can be electronically captured via, for instance, optical scanning of the paper or other medium, then compiled, interpreted, or otherwise processed in a suitable manner, if necessary, and then stored in a computer memory 404. In the context of this document, a computer-usable or computer-readable medium may be any medium that can store the program for use by or in connection with the instruction execution system, apparatus, or device. The computer-usable program code may be transmitted using any appropriate medium, including but not limited to wireless, wireline, optical fiber cable, RF, etc.

Computer program code (e.g., code 414) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider). Computer system 400 is an example of the user's computer or the remote computer on which the program code 414 may execute entirely or in part.

The present invention is described herein with reference to flowchart illustrations (e.g., FIGS. 1A-1D) and/or block diagrams of methods, apparatus (systems) (e.g., FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 414). These computer program instructions may be provided to a processor (e.g., CPU 402) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 404 or computer data storage unit 412) that can direct a computer (e.g., computer system 400) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computer system 400) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process for reconstructing a process model having an inclusive decision. Thus, an embodiment of the present invention discloses a process for supporting computer infrastructure, comprising integrating, hosting, maintaining and deploying computer-readable code (e.g., code 414) into a computer system (e.g., computer system 400), wherein the code in combination with the computer system is capable of performing a process for reconstructing a process model having an inclusive decision.

In another embodiment, the invention provides a business method that performs the process steps of the invention on a subscription, advertising and/or fee basis. That is, a service provider, such as a Solution Integrator, can offer to create, maintain, support, etc. a process for reconstructing a process model having an inclusive decision. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 1A-1D and the block diagram in FIG. 4 illustrate the architecture, functionality, and operation of possible implementations of systems, methods, and computer program products according to various embodiments of the present invention. In this regard, each block in the flowchart or block diagram may represent a module, segment, or portion of code (e.g., code 414), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of reconstructing an original process model that includes an inclusive decision into a reconstructed process model that includes a plurality of synchronized branches, said method comprising:
replacing, by a computer system, said inclusive decision with a fork node in said reconstructed process model, wherein said inclusive decision feeds m original paths in said original process model, wherein said m original paths are parallel paths capable of being activated, wherein said m original paths are associated in a one-to-one correspondence with m activities, wherein an activation of a j-th original path of said m original paths triggers an execution of a j-th activity of said m activities, wherein $1 \leq j \leq m$, and wherein said $m>1$;
said computer system reconstructing said j-th original path into a j-th reconstructed path of m reconstructed paths of said reconstructed process model, wherein said reconstructing said j-th original path into said j-th reconstructed path includes:
said computer system adding a j-th decision, said j-th activity, and a j-th merge node to said j-th reconstructed path;
said computer system connecting a first output included in said j-th decision to said j-th activity;
said computer system connecting an output of said j-th activity to a first input of said j-th merge node; and
said computer system connecting a second output included in said j-th decision to a second input of said j-th merge node;
said computer system creating a join node having m input branches in said reconstructed process model, wherein said creating said join node includes:
said computer system connecting m output branches to said m input branches of said join node; wherein said connecting said m output branches includes connecting an output branch of said j-th merge node to a first input branch included in said m input branches of said join node and connecting an output branch of another merge node to a second input branch included in said m input branches of said join node, wherein said another merge node is included in another reconstructed path of said m reconstructed paths; and
said computer system connecting an output of said join node to a modeling element;
said computer system storing said reconstructed process model in a computer data storage device; and
said computer system synchronizing said m output branches in a simulation of a process represented by said reconstructed process model, wherein said synchronizing includes waiting for a completion of processing of all activated reconstructed paths of said m reconstructed paths before executing an action associated with said modeling element.

2. The method of claim 1, wherein each original path of said m original paths includes one or more nodes, one or more data inputs, and one or more data outputs.

3. The method of claim 1, wherein said method further comprises:
receiving an input file that includes said original process model, wherein said original process model in said input file includes said inclusive decision that has n data inputs, wherein $n \geq 1$; and
creating said fork node to have said n data inputs and a control input.

4. The method of claim 3, wherein said method further comprises:
determining said n data inputs of said inclusive decision are from a process input to said original process model;
in response to said determining said n data inputs are from said process input, adding a start node to said reconstructed process model; and
connecting said start node to said control input of said fork node.

5. The method of claim 3, wherein said method further comprises:
determining said n data inputs of said inclusive decision are from a previous node within said original process model;

in response to said determining said n data inputs are from said previous node, adding a control output to said previous node; and connecting said control output to said control input of said fork node.

6. The method of claim 1, wherein said method further comprises receiving an input file that includes m percentages corresponding to said m original paths, wherein a j-th percentage of said m percentages indicates a likelihood that said j-th original path is activated, and wherein said reconstructing said j-th original path includes:

setting a Yes percentage to said j-th percentage, wherein said Yes percentage indicates a likelihood of a condition of said j-th decision being true; and setting a No percentage to a difference between 100 percent and said j-th percentage, wherein said No percentage indicates a likelihood of said condition being false.

7. The method of claim 1, wherein said method further comprises creating said fork node to have m output branches, and wherein said reconstructing said j-th original path includes adding said j-th decision as a binary decision between a j-th output branch (Fj) of said m output branches and an input of a first activity that follows said Fj, wherein said binary decision has a single control input.

8. The method of claim 1, wherein said method further comprises creating said fork node to have m output branches, and wherein said reconstructing said j-th original path includes:

adding said j-th merge node after an output of a first activity that follows a j-th output branch (Fj) of said m output branches;

defining said j-th merge node to have a single control input after said output of said first activity that follows said Fj; and further defining said j-th merge node to have two input branches.

9. The method of claim 1, wherein said method further comprises creating said fork node to have m output branches, and wherein said reconstructing said j-th original path includes connecting n data flow outputs of a j-th output branch (Fj) of said m output branches to corresponding data flow inputs of a first activity that follows said Fj.

10. The method of claim 9, wherein said reconstructing said j-th original path further includes connecting a control output of said Fj to an input of said j-th decision.

11. The method of claim 1, wherein said method further comprises creating said fork node to have m output branches, and wherein said reconstructing said j-th original path includes:

adding a control input to an input node of a first activity that follows a j-th output branch of said m output branches; and connecting a Yes output of said j-th decision to said control input.

12. The method of claim 1, wherein said method further comprises creating said fork node to have m output branches, and wherein said reconstructing said j-th original path includes:

adding a control output to an output node of a first activity that follows a j-th output branch (Fj) of said m output branches; and connecting said control output to said first input of said j-th merge node.

13. The method of claim 1, wherein said reconstructing said j-th original path includes connecting a No output of said j-th decision to said second input of said j-th merge node.

14. The method of claim 1, wherein said reconstructing said j-th original path includes leaving intact any outbound connections from an output node of said j-th original path.

15. The method of claim 1, wherein said creating said join node includes:

creating a single control output of said join node;

connecting a control output of a j-th merge node to a control input of a j-th input branch (Jj) of said m input branches of said join node; and connecting said control output of said join node to said modeling element.

16. A computer program product, comprising:

a non-transitory computer-readable storage device; and a computer-readable program code stored on the non-transitory computer-readable storage device, said computer-readable program code containing instructions that, when executed by a processor of a computer system, implement a method of reconstructing an original process model that includes an inclusive decision into a reconstructed process model that includes a plurality of synchronized branches, said method comprising:

said computer system replacing said inclusive decision with a fork node in said reconstructed process model, wherein said inclusive decision feeds m original paths in said original process model, wherein said m original paths are parallel paths capable of being activated, wherein said m original paths are associated in a one-to-one correspondence with m activities, wherein an activation of a j-th original path of said m original paths triggers an execution of a j-th activity of said m activities, wherein $1 \leq j \leq m$, and wherein said $m > 1$;

said computer system reconstructing said j-th original path into a j-th reconstructed path of m reconstructed paths of said reconstructed process model, wherein said reconstructing said j-th original path into said j-th reconstructed path includes:

said computer system adding a j-th decision, said j-th activity, and a j-th merge node to said j-th reconstructed path;

said computer system connecting a first output included in said j-th decision to said j-th activity;

said computer system connecting an output of said j-th activity to a first input of said j-th merge node; and said computer system connecting a second output included in said j-th decision to a second input of said j-th merge node;

said computer system creating a join node having m input branches in said reconstructed process model, wherein said creating said join node includes:

said computer system connecting m output branches to said m input branches of said join node, wherein said connecting said m output branches includes connecting an output branch of said j-th merge node to a first input branch included in said m input branches of said join node and connecting an output branch of another merge node to a second input branch included in said m input branches of said join node, wherein said another merge node is included in another reconstructed path of said m reconstructed paths; and said computer system connecting an output of said join node to a modeling element;

said computer system storing said reconstructed process model in a computer data storage device; and said computer system synchronizing said m output branches in a simulation of a process represented by said reconstructed process model, wherein said synchronizing includes waiting for a completion of processing of all activated reconstructed paths of said m reconstructed paths before executing an action associated with said modeling element.

17. The program product of claim 16, wherein said method further comprises:
receiving an input file that includes said original process model, wherein said original process model in said input file includes said inclusive decision that has n data inputs, wherein $n \geq 1$; and
creating said fork node to have said n data inputs and a control input.

18. The program product of claim 17, wherein said method further comprises:
determining said n data inputs of said inclusive decision are from a process input to said original process model;
in response to said determining said n data inputs are from said process input, adding a start node to said reconstructed process model; and
connecting said start node to said control input of said fork node.

19. The program product of claim 17, wherein said method further comprises:
determining said n data inputs of said inclusive decision are from a previous node within said original process model;
in response to said determining said n data inputs are from said previous node, adding a control output to said previous node; and
connecting said control output to said control input of said fork node.

20. A computer system comprising:
a central processing unit (CPU);
a memory coupled to said CPU;
a computer-readable, tangible storage device coupled to said CPU, said storage device containing instructions that when executed by said CPU via said memory implement a method of reconstructing an original process model that includes an inclusive decision into a reconstructed process model that includes a plurality of synchronized branches, said method comprising:
replacing, by a computer system, said inclusive decision with a fork node in said reconstructed process model, wherein said inclusive decision feeds m original paths in said original process model, wherein said m original paths are parallel paths capable of being activated, wherein said m original paths are associated in a one-to-one correspondence with m activities, wherein an activation of a j-th original path of said m original paths triggers an execution of a j-th activity of said m activities, wherein $1 \leq j \leq m$, and wherein said $m>1$;
said computer system reconstructing said j-th original path into a j-th reconstructed path of m reconstructed paths of said reconstructed process model, wherein said reconstructing said j-th original path into said j-th reconstructed path includes:
said computer system adding a j-th decision, said j-th activity, and a j-th merge node to said j-th reconstructed path;
said computer system connecting a first output included in said j-th decision to said j-th activity;
said computer system connecting an output of said j-th activity to a first input of said j-th merge node; and
said computer system connecting a second output included in said j-th decision to a second input of said j-th merge node;
said computer system creating a join node having m input branches in said reconstructed process model, wherein said creating said join node includes:
said computer system connecting m output branches to said m input branches of said join node; wherein said connecting said m output branches includes connecting an output branch of said j-th merge node to a first input branch included in said m input branches of said join node and connecting an output branch of another merge node to a second input branch included in said m input branches of said join node, wherein said another merge node is included in another reconstructed path of said m reconstructed paths; and
said computer system connecting an output of said join node to a modeling element;
said computer system storing said reconstructed process model in a computer data storage device; and
said computer system synchronizing said m output branches in a simulation of a process represented by said reconstructed process model, wherein said synchronizing includes waiting for a completion of processing of all activated reconstructed paths of said m reconstructed paths before executing an action associated with said modeling element.

\* \* \* \* \*